Aug. 8, 1967 J. B. BECK 3,335,355
SEMICONDUCTOR FILTER CIRCUIT
Filed March 20, 1964

INVENTOR.
JOHN B. BECK
BY

United States Patent Office 3,335,355
Patented Aug. 8, 1967

3,335,355
SEMICONDUCTOR FILTER CIRCUIT
John B. Beck, Indianapolis, Ind., assignor to Radio Corporation of America, a corporation of Delaware
Filed Mar. 20, 1964, Ser. No. 353,403
7 Claims. (Cl. 321—10)

This invention relates to electrical circuits and more particularly to electrical circuits for presenting a high dynamic impedance to alternating currents flowing therethrough.

A power supply in which an alternating current is rectified to produce a direct current (D-C) usually includes a filter circuit to minimize the alternating current (A-C) component that remains after rectification. This A-C component normally includes a number of sinusoidal currents of varying magnitudes at some harmonic relation to the rectified frequency and is known as ripple. The A-C component can also include noise resulting from transients and the like. The power supply filter circuit is used to reduce both the applied ripple and noise components.

One type of ripple filter often used comprises a plurality of capacitors and a two terminal device such as a resistor or a choke coil. The resistor or the choke coil is connected in series with the rectification means while one capacitor is generally connected across the rectification means and another across the load or output terminals. The capacitor across the rectification means provides a filtering action by presenting a fast charge time to the input signal and a long discharge time through the resistor or choke coil. The output capacitor provides a ripple voltage divider action along with the resistor or choke coil wherein the total parallel impedance of the capacitor at the lowest frequency of ripple is small compared with the impedance of the choke coil or resistance whereby the major part of the ripple voltage appears across the choke coil or resistance.

The resistor, while having a desired high impedance to the A-C ripple, also has an equally high D-C resistance thereby producing an undesirable power loss. The choke coil, while providing a high impedance to the A-C ripple and a low D-C resistance has the disadvantage of being large and heavy thereby introducing problems when the available space and total weight is limited.

Various three or four terminal active devices such as tubes or transistors have been designed into special circuits to improve over the standard resistor or choke filter. Although these circuits overcome some of the above-mentioned disadvantages, these circuits require additional components for biasing, etc., and therefore cannot be simply substituted into existing circuits as a direct replacement.

It is therefore an object of this invention to provide a new and improved direct current filter circuit.

It is also an object of this invention to provide a new and improved direct current filter using a two terminal semi-conductor device as a series ripple filter.

It is still a further object of this invention to provide a new and improved direct current filter circuit including a two terminal semiconductor device having a high impedance to A-C and a low resistance to D-C as a series ripple filter.

The direct current filter of the present invention comprises a semiconductor device having a rectifying junction connected for reverse current flow in series with the direct current circuit to be filtered. Heat which is generated by the reverse current or by external means causes the reverse current of the device to increase to the level demanded by the power supply. Upon reaching the desired level of current, the rectifying junction achieves an equilibrium condition at an elevated temperature and operates as a constant current device providing a low D-C resistance and a high A-C impedance thereby acting as a series filter.

The novel features which are considered to be characteristic of this invention are set forth in particularity in the appended claims. The invention itself, however, both as to its organization and method of operation will best be understood when read in conjunction with the accompanying drawings, in which:

Figures 1, 2, 3, 4, 5:
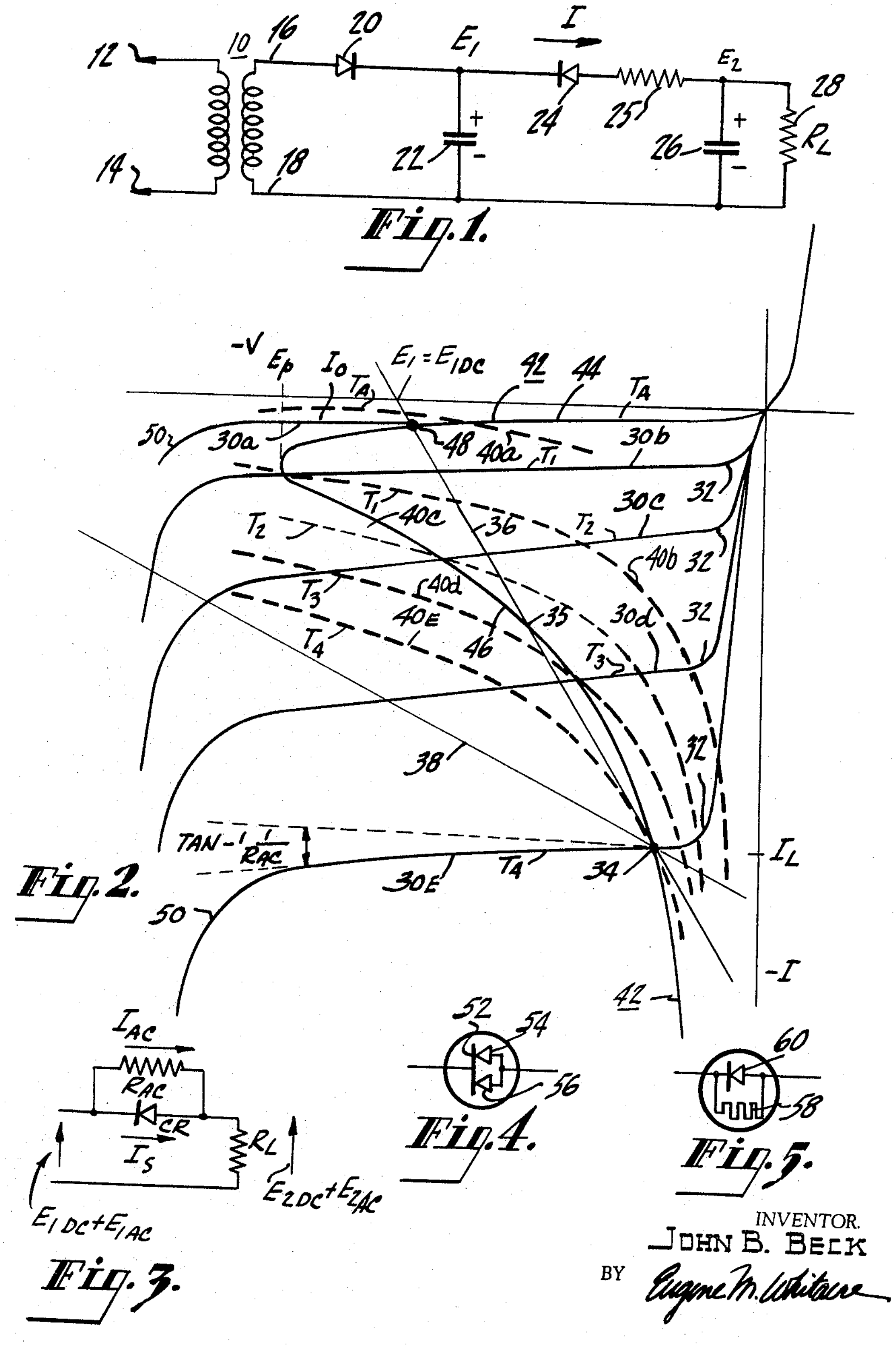
FIGURE 1 is a schematic circuit of a power supply including a semiconductor filter circuit embodying the invention.
FIGURE 2 is a graphic representation of the interrelation of the voltage, current and temperature as applied to the semiconductor filter device of FIGURE 1.
FIGURE 3 is an equivalent circuit of the semiconductor filter device of FIGURE 1.

FIGURE 4 schematically represents a modification of a semiconductor filter device of FIGURE 1; and FIGURE 5 schematically represents a further modification of a semiconductor filter device of FIGURE 2.

In referring to the drawings, like elements and parts are designated by like reference characters throughout the figures. The filter circuit embodying the invention includes a reverse biased semiconductor rectifying junction (which in the present example is a reversed biased diode) as a series ripple filter. The filter action of the diode junction is based upon its reverse current characteristic, wherein at a constant junction temperature the reverse current through the diode is nearly constant for a given range of voltage variations across the diode.

FIGURE 1 is an illustration of a standard type power supply circuit using the diode filter. The A-C input power is transformer coupled to the rectifier circuit through a power transformer 10, the primary terminals 12 and 14 being connected to the source of power and the secondary terminals 16 and 18 being connected to the rectifying circuit. The output from the transformer is rectified by a diode 20, which is in turn connected to the power supply filter circuit. The power supply filter circuit of the present example comprises of an input capacitor 22 connected in parallel with the combined transformer and rectifier circuit, a series semiconductor diode 24 connected for reverse current flow, a series resistor 25 and an output capacitor 26 connected in parallel with a resistor 28. Resistor 28 is labelled $R_L$ and represents the connected load. The resistor 25 serves to dampen any oscillating conditions that may exist in the filter circuit.

The operation of the filter circuit and more particularly the operation of the diode 24 will be better understood by reference to FIGURE 2. The curves 30*a*, 30*b*, 30*c*, 30*d* and 30*e* of FIGURE 2 represent the isothermal reverse voltage-current characteristic of the diode 24 at several different junction temperatures. The curve 30*a* is the reverse current curve at a junction temperature equal to a designated ambient room temperature while the curves 30*b*–30*e* represent progressively increasing temperatures. The diode reverse current is strongly dependent on temperature. The reverse current of a typical silicon diode varies exponentially with temperature and is approximately doubled every 8° C., whereby large changes of reverse current are observed for correspondingly small changes in junction temperature. In certain applications a germanium diode or gallium-arsenide diode may be used as well as a silicon diode but the silicon diode is preferred because of its inherent capabilities of withstanding higher temperatures.

The isothermal curves 30*a*–30*e* display a knee 32 at relatively low reverse voltages. For a range of reverse voltages beyond the knee 32, the diode reverse current is substantially independent of the voltage across the diode. As a result, the current through the diode 24, while operating on the flat portion of the isothermal curve (point 34), is substantially independent of the ripple of the applied voltage $E_1$. The isothermal curves 30*a*–30*e* are not exactly flat, but rather slope as a function of applied voltage, and vary from one type of diode to another. The more the slope of the isothermal curves 30*a*–30*e* parallels the abscissa (voltage axis) at the operating point of the diode, the greater the dynamic impedance will be. These curves 30*a*–30*e* also display a knee 50 at substantially higher reverse voltage.

The total reverse current through diode 24 can be approximately represented as being made up of two components, a saturation current $I_S$ and a leakage current $I_l$. The leakage current $I_l$ is due to imperfections in the junction and in many cases is designed to a negligible value and therefore can be ignored. The junction saturation current $I_S$ is of primary interest because of its temperature sensitivity.

The slope in the isothermal curves 30*a*–30*e* beyond the knee 32, and before the knee 50, is a result of an increasing junction depletion region due to the increasing magnitude of the applied voltage. Although the slope may not always be linear, for practical purposes the effect of the increased junction depletion area and corresponding increase in current can be approximated by a linear resistor $R_{ac}$ connected across the perfect diode CR in FIGURE 3, the equivalent circuit of diode 24. The slope of the isothermal lines 30*a*–30*e* between the knee 32 and the voltage break-down point 50 is a good approximation of the conductance value $1/R_{ac}$ of the resistor $R_{ac}$. The magnitude of ripple current that passes through the diode is a direct function of the slope of the isothermal lines 30*a*–30*e*, therefore, all the ripple current $I_{ac}$ in the equivalent circuit (FIG. 3) can be represented as flowing through $R_{ac}$ only. The D-C component of current can thereby be represented as flowing through the perfect diode CR. The diode CR will have a constant voltage drop depending upon its operation point along the respective isothermal curve.

$E_{1dc}+E_{1ac}$ of FIGURE 3 is the rectified D-C and ripple components respectively as applied to the anode of the filter diode 24. The output of the diode filter is applied across the load $R_L$ and is designated by $E_{2dc}+E_{2ac}$ which constitutes the D-C output voltage and the output ripple component respectively. Since all the ripple current $I_{ac}$ flows through $R_{ac}$, the ripple action of the equivalent circuit can be approximated by the ratio $$\frac{E_{2ac}}{E_{1ac}}=\frac{R_L}{R_{ac}+R_L}$$

The effective inductance of the filter diode is found by substituting $\omega L_{eff}$ (effective inductance) for $R_{ac}$ whereby $$L_{eff}=\frac{R_L}{\omega}\left(\frac{E_{1ac}}{E_{2ac}}-1\right)$$

Though the effective inductance $L_{eff}$ may not be constant for variations in voltage level or frequency, the effective inductance is a measure of the inductive qualities of the diode filter. The diode effective inductance, when specified along with the diode effective D-C resistance and the load current, is a convenient means for expressing the efficiency of the effective filter action. By way of example, filter circuits embodying the invention have been tested and effective values of inductance up to 400 henries have been observed along with an effective D-C resistance of 100 ohms at 140 milliamperes flowing through a 1,000 ohm load.

The diode 24 exhibits a high dynamic impedance if the static or D-C operation point is located at a point where the dynamic action of the diode remains on the constant current portion of the isothermal curve and the current flow still meets the power requirements of the load. In the present example, point 34 has been selected as the operating point designated by the required load current $I_L$ and a minimum D-C voltage drop across the diode. A pair of load lines 36 and 38 are projected through the operating point 34 to simulate different initial circuit conditions. As the voltage $E_1$ varies due to its ripple component, the corresponding load line will shift to the left and right about its position shown in FIGURE 2. As the voltage $E_1$ approaches a peak value, the corresponding load line as viewed in FIGURE 2 will shift to the left in parallel relation to the position as shown, and as $E_1$ approaches the minimum value the load line will shift to the right. This shifting or oscillating of the load line about the operating point 34 over the constant current portion of the isothermal curve 30*e* will produce very little change in the load current $I_L$. As long as the ripple voltage variations do not result in shifting the load line beyond the knee 32 of the breakdown voltage 50 of the respective isothermal curve, the diode has an effective high dynamic impedance (A-C impedance) to the ripple voltage and a much lower D-C resistance.

The particular diode that can be applied to a given application is determined by the magnitude of the required load current, its thermal dissipation time constant and the temperature to which the diode junction must be raised to pass the required load current. The diode thermal time constant should be large compared to the frequency of the applied ripple so that the voltage excursions will not vary the stabilized junction operation temperature. Since an excessive temperature will destroy the semiconductor junction, the junction temperature is a limiting operational factor. The reverse saturation current $I_S$ at ambient temperature may be used to compute the maximum current carrying capabilities of the particular diode at its limiting junction temperature. For an increased junction operating temperature between 150 to 300° C., the operating reverse currents have been calculated to be as high as $10^6$ to $10^{12}$ times that at ambient temperature.

The magnitude of the ambient temperature reverse saturation current $I_S$ is a direct function of the size of the junction depletion region. The depletion region is created by the thermally generated hole-electron pair diffusion current due to the junction of a P or acceptor type semiconductor material with an N or donor type semiconductor material. A wide depletion region is created by joining a high impurity doped region with a low impurity doped region whereby the average distance of penetration (diffusion length) and lifetime of the hole-electron diffusion before recombining is increased thereby directly increasing the saturation current per unit area. The wide depletion region diode (higher initial thermally generated current) has the advantage of being capable of operation at a lower temperature for a given load requirement than that of a diode with a corresponding area but a narrower depletion region. The lower operating temperature is important if stability and long life is to be obtained.

A high initial saturation current may also be obtained through the use of a P-I-N type diode, or a radiation or light sensitive diode. The P-I-N diode contains an intrinsic region (no doping) between a P and an N type region. The intrinsic region forms the required wide depletion region. In the radiation or light sensitive diode, the initial high saturation current is created by the bombardment of the junction by radiation or exposure to light, respectively.

In the present example, in order to pass the required load current $I_L$ and operate on the isothermal curve 30*e* (FIGURE 2), the rectifying junction must be raised to the temperature $T_4$. This temperature may be reached by exceeding either the junction avalanche breakdown voltage or the peak inverse voltage. Both breakdown conditions may be created by the application of a reverse voltage exceeding the respective limit, while the peak inverse breakdown may also be exceeded by applying a given voltage less than the breakdown value along with the application of external heat. This will be better understood by reference to FIGURE 2.

In FIGURE 2 the dashed lines 40*a*–40*e* are hyperbolas of constant power dissipation using increments of power that are assumed to be proportional (through Newton's law of cooling) to the increments of temperature used in laying out the isothermal curves 30a–30e. A thermal equilibrium characteristic for the designated ambient temperature can be plotted by connecting the intersections of the isothermal curves 30a–30e and the respective constant power hyperbolas 40a–40e. The thermal equilibrium characteristic is illustrated in FIGURE 2 as a heavy line 42. The thermal equilibrium characteristic exhibits a region of positive resistance slope 44 having a substantially constant low current for a wide range of applied voltage until the voltage $E_p$ is exceeded. This voltage ($E_p$) is the peak inverse voltage. If the peak inverse voltage ($E_p$) is exceeded, the thermal equilibrium characteristic 42 then exhibits a negative resistance slope 46.

If the diode 24 is inserted in a circuit with a load line 36 and an applied voltage ($E_1$) is less than the peak inverse voltage ($E_p$) as shown in FIGURE 2, the diode operates at point 48 on the positive resistance slope 44 of the thermal equilibrium characteristic 42. If the diode is inserted into a circuit with the load line 38, wherein an extension of the load line 38 to an intersection with the voltage axis indicates the application of a voltage that exceeds the peak inverse voltage ($E_p$), then the diode operates at point 34. Exceeding the peak inverse breakdown voltage ($E_p$) causes a regenerative effect wherein the diode junction temperature increases until it has reached a stable operating temperature $T_4$, at the common intersection of the load line 38, the respective isothermal curve 30e, and the thermal equilibrium characteristic 42 for the designated ambient temperature. It should be noted at this time that exceeding the avalanche breakdown voltage 50 (FIGURE 2) results in the same reaction as that of exceeding the peak inverse voltage.

The thermal equilibrium characteristic 42 of FIGURE 2 represents a locus of operating points after the diode 24 has stabilized over a period of time. If the ambient temperature is changed, the thermal equilibrium curve assumes a new shape. An increase in ambient temperature causes the peak inverse voltage $E_p$ to decrease (move to right in FIGURE 2). If, as previously mentioned, the diode 24 is inserted in a circuit with a load line 36 and the the applied voltage $E_1$ is less than the peak inverse voltage $E_p$ (as shown in FIGURE 2), the diode operates at point 48 where the load line 36 intersects the positive resistance slope 44. Under these conditions, the diode can be heated by the application of heat from an external source to cause operation at point 34. The application of heat to the diode reduces the peak inverse voltage $E_p$ to a point where the applied voltage exceeds it. Once the peak inverse voltage $E_p$ is exceeded, the internal heat created by the increase current flow causes a regenerative type effect thereby causing the diode to operate at point 34 when the diode has reached thermal stability with the ambient temperature. The intersection of load line 36 with the thermal equilibrium characteristic 42 at point 35 is an unstable point of operation and therefore the circuit does not stably operate at that point.

As previously mentioned, for a required value of load current $I_L$, it is desired to have as wide a depletion region as possible so that the temperature to which the diode junction must be raised to pass the required reverse current can be minimized. However, the peak inverse voltage $E_p$ of the diode junction also increases with an increased width of the depletion region (the peak inverse voltage $E_p$ moves to the left in FIGURE 2). The avalanche breakdown voltage 50 of FIGURE 2 is also a direct function of the width of the depletion region. The avalanche affect is caused by a very high field created across the depletion region. This high field causes the depletion region hole and electron pair current to increase in velocity, which in turn results in an increased number of collisions, thus further increasing the carrier current. If a sufficiently high field is created across the depletion region the electron collisions reach a point at which the avalanche breakdown takes affect. With a wider depletion region, a higher voltage must be placed across the diode junction to create the necessary field to produce the avalanche effect.

As a result, where high load currents are required, it is desirable to use a diode having a wide depletion region. This in turn further requires a very high power supply voltage to exceed the junction avalanche breakdown voltage or the peak inverse voltage. In many cases the application of such a high voltage may not be practical. Where the use of these high voltages is not practical, the diode used in the filter of FIGURE 1 may be of the form shown in FIGURES 4 and 5.

The modification in FIGURE 4 shows a double anode diode formed on a single cathode crystal. In the present example the anodes 54 and 56 comprise a highly doped (low resistivity) and a low doped (high resistivity) P or donor type semiconductor material respectively, forming two junctions on a single N or acceptor type semiconductor cathode 52. The anode 54 junction (highly doped will have a narrow depletion region (low initial saturation current) and a corresponding low avalanche breakdown voltage. The anode 56 junction (low doped) will have a wide depletion region (high initial saturation current) with a high avalanche breakdown voltage and high peak inverse voltage. The low avalanche junction 54 is designed to break down at a voltage less than $E_1$ (FIGURE 2). The high avalanche diode 56 is designed to give a high initial saturation current per unit area and hence will exhibit an avalanche breakdown voltage and a peak inverse voltage exceeding the applied rectified voltage $E_1$.

The substitution of the diode of FIGURE 4 for the diode of FIGURE 1, results in the avalanche breakdown of the diode junction 54 causing a high current flow, thereby heating the common cathode crystal 52. This heating effect in turn reduces the peak inverse voltage of diode 56 which, through the regenerative effect previously mentioned, operates on the negative slope of its thermal equilibrium characteristic. Once the high saturation current diode junction 56 breaks down, it takes control by effectively bypassing junction 54. Since junction 56 is capable of passing a required load current at a much lower temperature than that of junction 54, the common cathode crystal 52 will reach a temperature where the current contribution of the low avalanche junction 54 can be neglected.

FIGURE 5 shows a further modification wherein a small heating unit is placed into the diode container. When the diode is placed into the circuit of FIGURE 1 the heater resistor 58 initially conducts to supply the heat necessary to exceed the peak inverse voltage of the high saturation current diode 60. Upon the breakdown of diode 60, the heater resistor 58 will be effectively bypassed wherein the diode 60 will operate as a filter as previously mentioned.

From the foregoing description it can be seen that a two terminal semiconductor device providing a rectifying junction can be reverse biased to operate as a ripple filter capable of being used instead of resistors or filter chokes. The operation of the junction at elevated temperatures provides a high dynamic impedance and a low direct current resistance thereby providing an improved series ripple filter requiring a minimum of space for installation and at the same time operating with a minimum of power dissipation.

What is claimed is:

1. A filter circuit for a power supply providing pulsating direct current comprising:

a semiconductor device with a rectifying junction, said junction having a thermal equilibrium characteristic that exhibits a low current region and a positive resistance slope until a peak inverse voltage is exceeded and then exhibiting a higher current region with a negative resistance slope, said peak inverse voltage being inversely proportional to the ambient temperature;

means connecting said semiconductor device rectifying junction to the power supply for reverse current flow through said rectifying junction; and means causing said device to operate in the high conductive negative resistance region of its thermal equilibrium characteristic such that said rectifying junction exhibits a high dynamic impedance and a lower effective direct current resistance.

2. A filter circuit for a power supply providing pulsating direct current comprising:
a semiconductor device with a rectifying junction, said junction having a thermal equilibrium characteristic that exhibits low current region and a positive resistance slope until a peak inverse voltage is exceeded and then exhibiting a higher current region with a negative resistance slope; and
means connecting said device in series with the power supply output for reverse current flow, the voltage of said power supply being of a magnitude to exceed said peak inverse voltage so that said junction breaks down and operates on said high conductive negative resistance region of said thermal equilibrium characteristic such that said rectifying junction exhibits a high dynamic impedance which is significantly greater than the effective direct current resistance at the operating point.

3. An electrical circuit comprising:
a semiconductor device including a rectifying junction, said junction being responsive to a temporary non-destructive reverse voltage breakdown producing a regenerative effect to heat said junction to provide a substantially increased reverse current at an elevated junction temperature;
means providing a source of pulsating direct current signals; and
means connecting said semiconductor device to said pulsating source for reverse current flow across said junction, said reverse current flow producing said breakdown so as to cause said semiconductor device to exhibit a low effective direct current resistance and a high dynamic impedance while operating as a constant current device for a given voltage variation across said junction at said increased reverse current.

4. A filter circuit for a power supply providing pulsating direct current signals comprising:
a semiconductive device providing a rectifying junction, said junction having a peak inverse voltage which, if exceeded, will cause a non-destructive breakdown of said junction;
a load impedance; and
means connecting said semiconductor device in series with said pulsating power supply and said load impedance for reverse current flow across said rectifying junction, said pulsating direct current signals having a magnitude greater than said peak inverse voltage causing a temporary non-destructive breakdown of said rectifying junction to provide an increased reverse current at an elevated junction temperature and a decreased reverse voltage so that said junction presents a low effective D.-C. resistance and a substantially high A.-C. impedance while operating as a constant current device for a given voltage variation across said junction at said increased reverse current.

5. An electrical circuit comprising:
a semiconductor device providing a rectifying junction, said junction having an avalanche breakdown voltage which if exceeded will cause a breakdown of said rectifying junction;
a load impedance;

means providing a source of pulsating direct current signals; and
means connecting said semiconductor device in series with said pulsating source of signals and said load impedance for reverse current flow across said rectifying junction, said pulsating signals having an amplitude greater than that of said avalanche breakdown voltage of said rectifying junction causing a temporary non-destructive breakdown of said junction so that said device is heated to provide an increased reverse current at an elevated junction temperature and a decreased reverse voltage to provide a low effective direct current resistance and a substantially high A.-C. impedance while operating as a constant current device for a given voltage variation across said junction at said increased reverse current.

6. An electrical circuit comprising:
a semiconductor diode providing a rectifying junction, said junction having a peak inverse voltage which if exceeded will cause a breakdown of said junction; said peak inverse voltage being inversely proportional to ambient temperatures;
means providing a source of pulsating direct current signals, said pulsating signals having an amplitude less than said peak inverse voltage of said diode;
a load impedance;
means connecting said semiconductor diode in series with said pulsating source of signals and said load impedance for reverse current flow across said rectifying junction; and
means for heating said diode junction to cause a temporary non-destructive peak inverse voltage breakdown of said diode, said breakdown causing a regenerative current build-up so that said rectifying junction temperature is increased to provide an increased reverse current while having a low effective direct current resistance and a high alternating current impedance.

7. An electrical circuit comprising:
a semiconductor diode exhibiting a rectifying junction with a wide depletion region, said junction being responsive to a temporary non-destructive reverse voltage breakdown producing a regenerative effect to heat said junction to provide a substantially increased reverse current;
means providing a source of direct current voltage having ripple voltage variations thereon; and
means connecting said semiconductor diode to said pulsating source for reverse current flow across said junction producing said non-destructive breakdown so that said semiconductor device provides a low effective direct current resistance and a high dynamic impedance while operating as a constant current device for a given voltage variation across said junction at said increased reverse current.

References Cited

UNITED STATES PATENTS

| | | | |
|---|---|---|---|
| 3,090,017 | 5/1963 | Novic | 321—10 X |
| 3,105,920 | 8/1963 | Dewey | 307—88.5 |
| 3,242,392 | 3/1966 | Hayashi et al. | 317—234 |

JOHN F. COUGH, *Primary Examiner.*

W. H. BEHA, *Assistant Examiner.*